US009233721B2

(12) United States Patent
Kakstis

(10) Patent No.: US 9,233,721 B2
(45) Date of Patent: Jan. 12, 2016

(54) COUPLING ASSEMBLY

(71) Applicant: GM GLOBAL TECHNOLOGY OPERATIONS LLC, Detroit, MI (US)

(72) Inventor: Kyle J. Kakstis, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 14/252,875

(22) Filed: Apr. 15, 2014

(65) Prior Publication Data

US 2015/0291230 A1   Oct. 15, 2015

(51) Int. Cl.
*B61D 45/00* (2006.01)
*B62D 33/02* (2006.01)
*B60P 7/08* (2006.01)
*B62D 25/24* (2006.01)
*B60P 7/135* (2006.01)

(52) U.S. Cl.
CPC ........... *B62D 33/0207* (2013.01); *B60P 7/0815* (2013.01); *B60P 7/135* (2013.01); *B62D 25/24* (2013.01)

(58) Field of Classification Search
CPC ............................... E05B 55/00; E05B 55/005
USPC .......... 410/96, 122, 143, 144, 152; 403/1, 11, 403/49, 205, 213, 292, 321, 322.1, 325, 403/327, 382
See application file for complete search history.

(56) References Cited

U.S. PATENT DOCUMENTS

| 1,238,874 | A | * | 9/1917 | Biela | 410/143 |
| 1,868,638 | A | * | 7/1932 | Mackey | 410/152 |
| 3,130,690 | A | * | 4/1964 | Johnston | 410/144 |
| 5,197,642 | A | * | 3/1993 | Cortelli | 224/310 |
| 6,786,687 | B1 | * | 9/2004 | Schroeder | 410/43 |
| 6,887,197 | B2 | * | 5/2005 | Phillips | 600/213 |
| 7,013,766 | B2 | * | 3/2006 | Lee | 81/177.85 |
| 7,569,014 | B2 | * | 8/2009 | Bass et al. | 600/213 |
| 8,038,362 | B2 | * | 10/2011 | Kawanabe | 403/11 |
| 8,434,429 | B2 | * | 5/2013 | Moeller | 119/795 |
| 8,690,503 | B2 | * | 4/2014 | Chamoun | 410/121 |
| 2004/0208692 | A1 | * | 10/2004 | Anthony et al. | 403/327 |
| 2006/0039746 | A1 | * | 2/2006 | Stringer | 403/49 |
| 2006/0178566 | A1 | * | 8/2006 | Fetzer | 600/234 |
| 2015/0063905 | A1 | * | 3/2015 | Wang | 403/327 |
| 2015/0158411 | A1 | * | 6/2015 | Pakulak et al. | |
| 2015/0204367 | A1 | * | 7/2015 | Lin | |

* cited by examiner

*Primary Examiner* — Hilary Gutman
(74) *Attorney, Agent, or Firm* — Quinn Law Group, PLLC

(57) ABSTRACT

A coupling assembly includes a hook, a base defining a base cavity, a link interconnecting the hook and the base, and a fastener movably coupled to the base. The fastener is movable relative to the base along an axis between a locked position and an unlocked position. In the locked position, the fastener extends through the base cavity. In the unlocked position, the fastener is outside the base cavity. The coupling assembly further includes a casing fixed to the base such that the base remains stationary relative to the casing. The fastener is partially disposed within the casing. The coupling assembly also includes a biasing member operatively coupled between the casing and the fastener such that the biasing member biases the fastener toward the locked position.

20 Claims, 5 Drawing Sheets

COUPLING ASSEMBLY

TECHNICAL FIELD

The present disclosure relates to a coupling assembly for a pickup bed.

BACKGROUND

Pickup trucks include a pickup bed capable of holding cargo. Some pickup beds also include at least one tie-down assembly for holding objects. In particular, straps or ropes can be tied to the tie-down assembly to restrain objects in the pickup bed. In addition, a beam may be coupled to the pickup bed to organize and separate cargo in the pickup bed. The beam should be secured to the pickup bed via, for example, the tie-down assembly. It is thus useful to develop a coupling assembly capable of coupling the beam to the tie-down assembly of a pickup bed.

SUMMARY

The present disclosure relates to a coupling assembly for coupling a beam to a tie-down assembly of a pickup bed. In an embodiment, the coupling assembly includes a hook, a base defining a base cavity, a link interconnecting the hook and the base, and a fastener movably coupled to the base. The fastener is movable relative to the base along an axis between a locked position and an unlocked position. In the locked position, the fastener extends through the base cavity. In the unlocked position, the fastener is outside the base cavity. The coupling assembly further includes a casing fixed to the base such that the base remains stationary relative to the casing. The fastener is partially disposed within the casing. The coupling assembly also includes a biasing member operatively coupled between the casing and the fastener such that the biasing member biases the fastener toward the locked position.

The present disclosure also relates to a vehicle, such as a pickup truck. The vehicle includes a pickup bed including first and second sidewalls. Further, the vehicle includes a tie-down assembly coupled to the first or second sidewall. The tie-down assembly includes a loop. The loop defines an aperture. The vehicle further includes a coupling assembly as discussed above. The coupling assembly can couple a beam to the first or second sidewall of the pickup bed.

The above features and advantages and other features and advantages of the present invention are readily apparent from the following detailed description of the best modes for carrying out the invention when taken in connection with the accompanying drawings.

DETAILED DESCRIPTION

Figure 1:
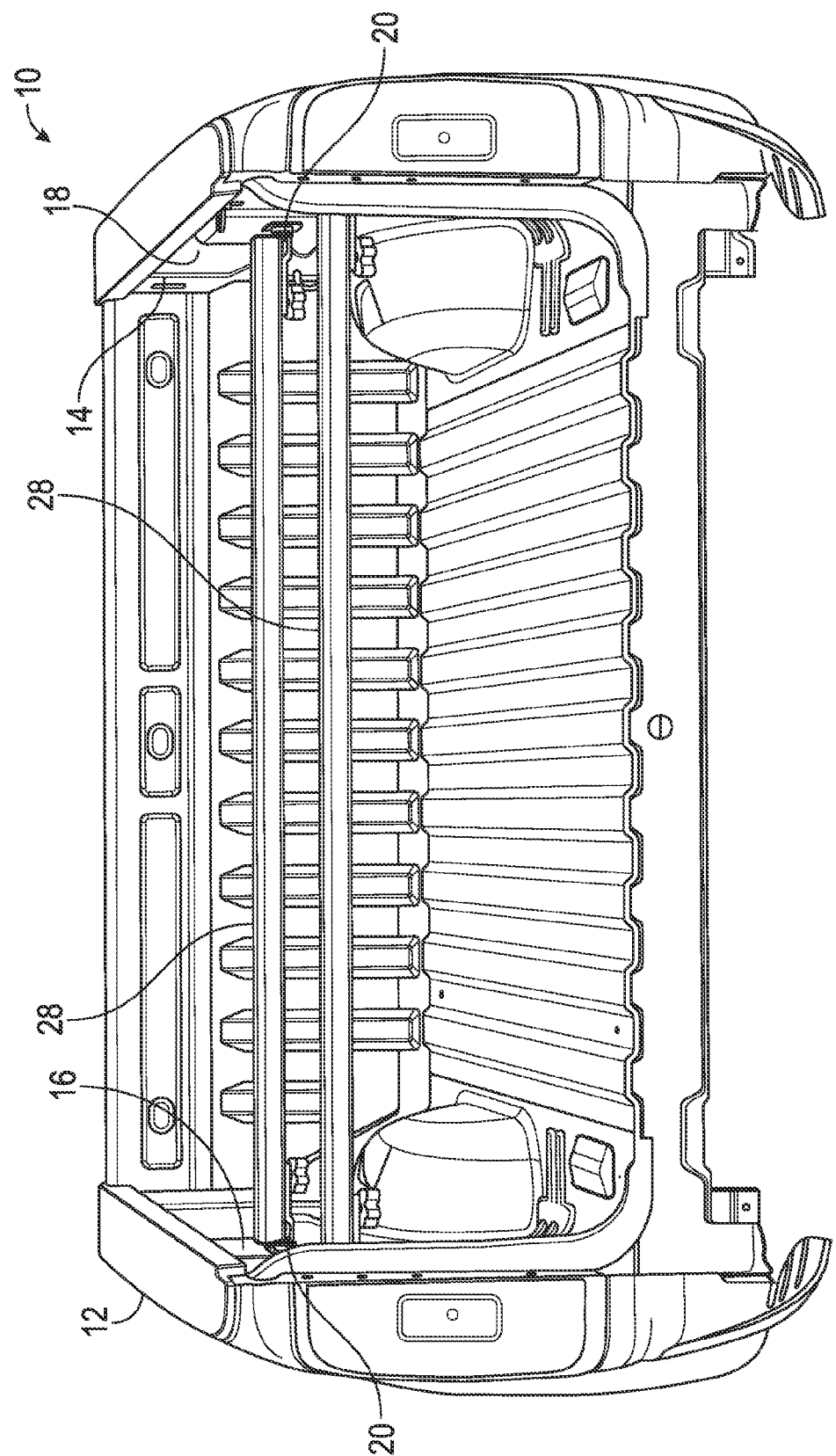
FIG. 1 is a schematic perspective view of a pickup bed and a plurality of beams used to hold cargo, wherein the beams are coupled to the sidewalls of the pickup bed in a functional position.

Referring to the drawings in which like elements are identified with identical numerals throughout, FIG. 1 depicts part of a vehicle 10 including a pickup bed 12. The vehicle 10 may be a pickup truck, and the pickup bed 12 defines a cargo compartment 14 and includes first and second inner sidewalls 16, 18. In addition to the pickup bed 12, the vehicle 10 may include at least one tie-down assembly 20 for facilitating attachment of other objects to the pickup bed 12. In the depicted embodiment, the vehicle 10 includes a plurality of tie-down assemblies 20 (see also FIG. 4) coupled to the first and second inner sidewalls 16, 18 of the pickup bed 12.

The vehicle 10 further includes at least one beam 28 coupled to at least one tie-down assembly 20 in a first or functional position. In the depicted embodiment, the vehicle 10 includes two beams 28 each extending from the first inner sidewall 16 to the second inner sidewall 18. Each beam 28 is coupled to one tie-down assembly 20 attached to the first inner sidewall 16 and another tie-down assembly 20 attached to the second inner sidewall 18. When coupled to the pickup bed 12 in the functional position, the beams 28 can help separate and organize cargo in the cargo compartment 14.

Figure 4:
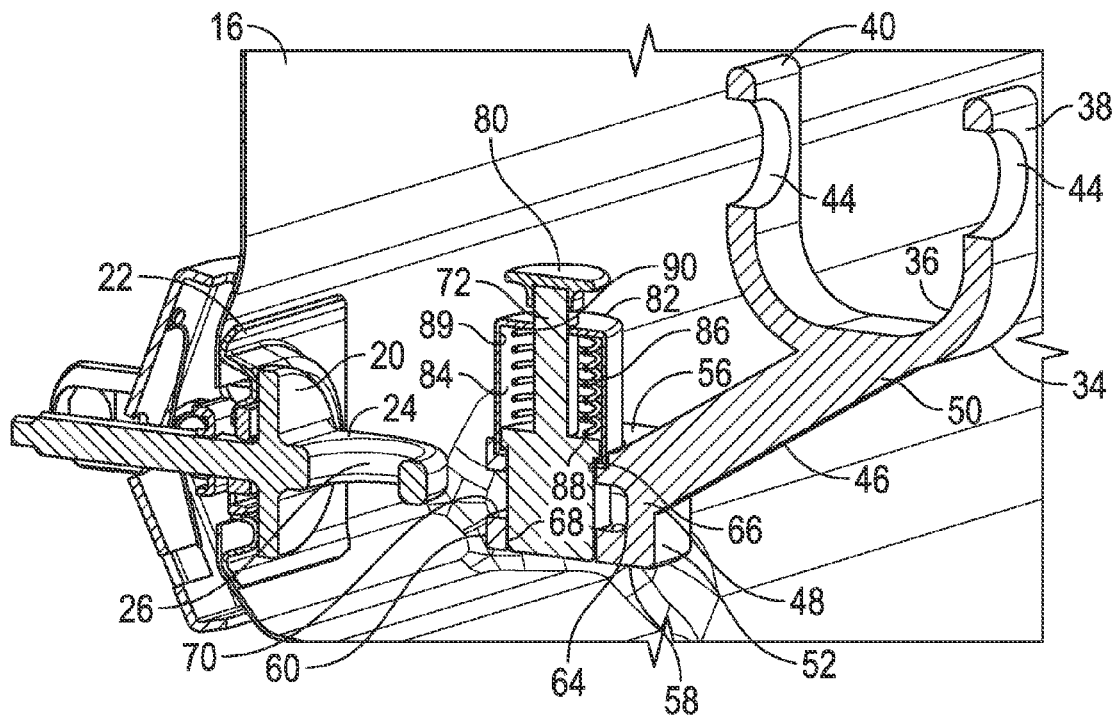
FIG. 4 is a schematic perspective, sectional view of the coupling assembly shown in FIG. 3 and a portion of the pickup bed including a tie-down assembly attached to a sidewall of the pickup bed, wherein the coupling assembly is in a locked position and is decoupled from the tie-down assembly.

With reference to FIG. 4, each tie-down assembly 20 includes a tie-down backing plate 22 attached to the first or second inner sidewall 16, 18 (FIG. 1) and a loop 24 coupled to the tie-down backing plate 22. Each loop 24 defines an aperture 26. The aperture 26 may have a substantially circular shape.

Figure 2:
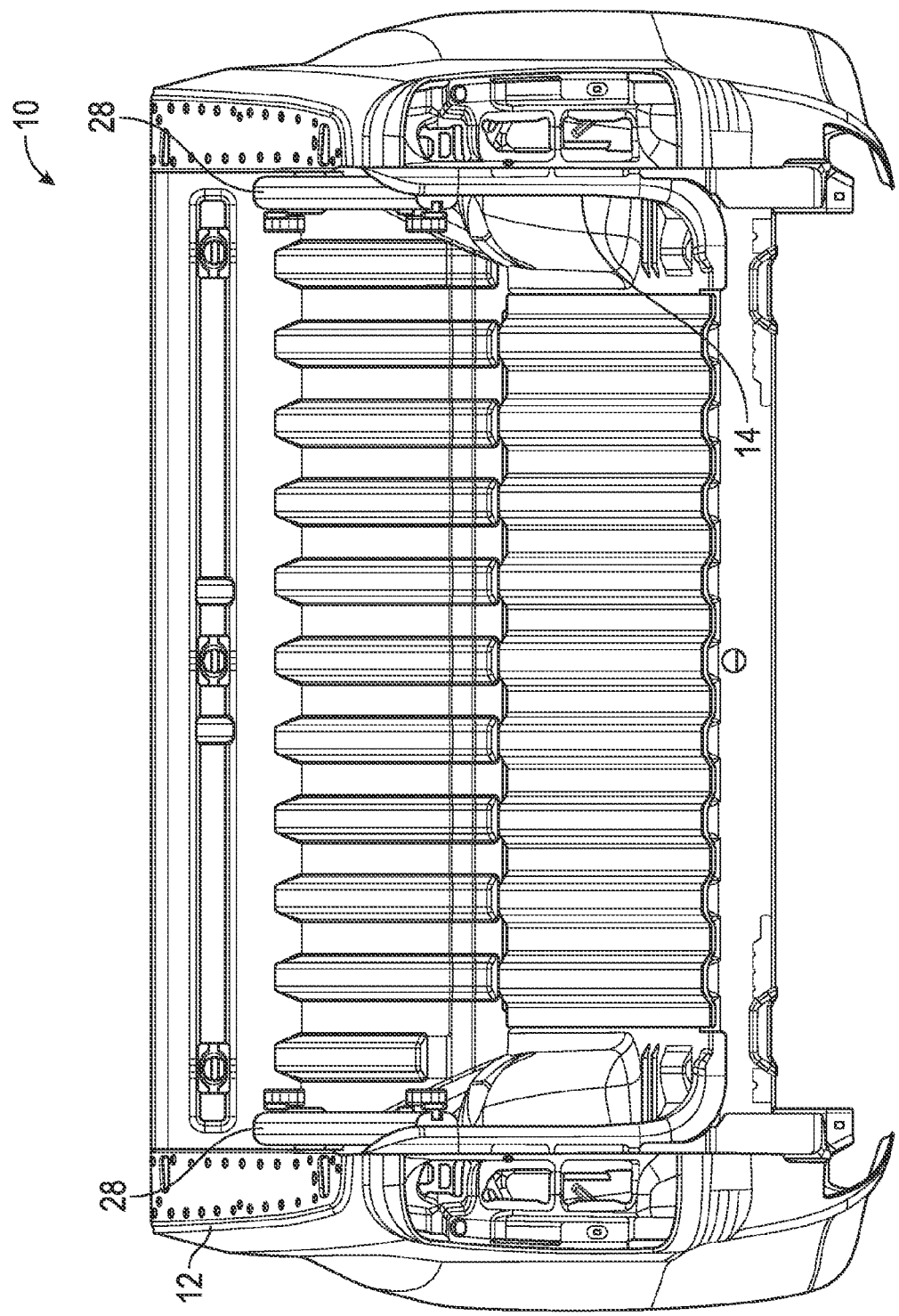
FIG. 2 is a schematic perspective view of the pickup bed and the plurality of beams, wherein the beams are coupled to the sidewalls of the pickup bed in a storage position.

As shown in FIG. 2, it is useful to couple beams 28 to the pickup bed 12 in a second or storage position when there is no need to separate cargo in the cargo compartment 14. In the storage position, the beams 28 do not extend from the first inner sidewall 16 to the second inner sidewall 18. Rather, each beam 28 extends along one of the first and second inner sidewalls 16, 18 when coupled to the pickup bed 12 in the storage position.

Figure 3:
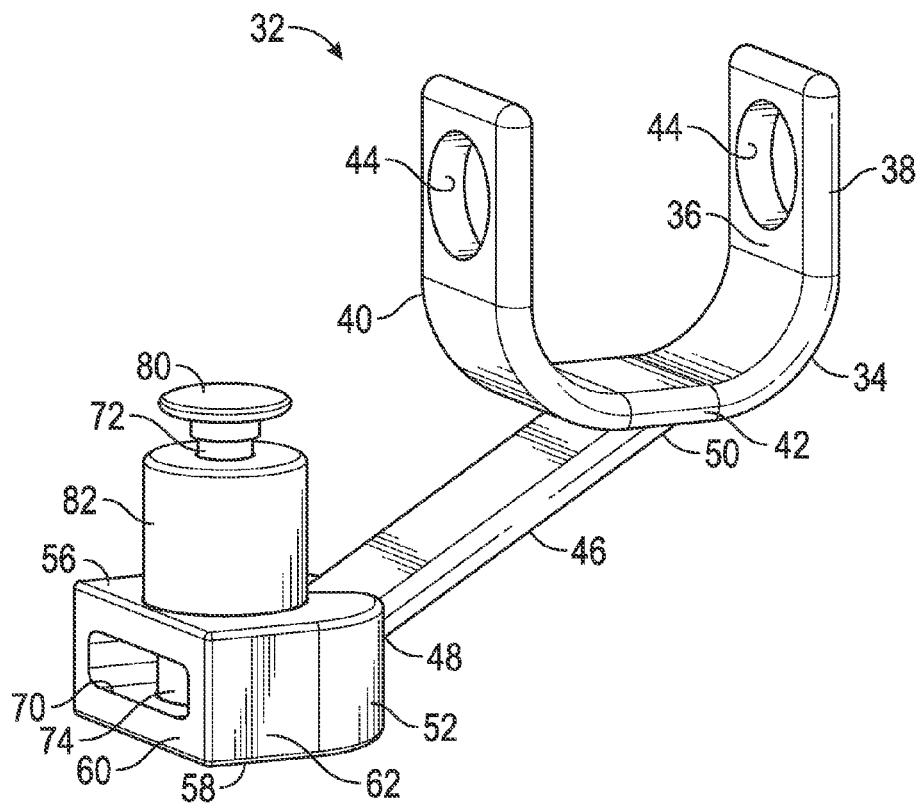
FIG. 3 is a schematic perspective view of a coupling assembly for coupling a beam to a pickup bed.

With reference to FIG. 3, a coupling assembly 32 can be employed to couple each beam 28 (FIG. 1) to the pickup bed 12 in the storage position (see FIG. 2). Also, the coupling assembly 32 can be coupled to the tie-down assembly 20. In the depicted embodiment, the coupling assembly 32 includes hook 34 for receiving at least one beam 28. The hook 34 may be wholly or partly made of a substantially rigid material, such as metal, and defines a recess 36 configured, shaped, and sized to receive at least one beam 28 (FIG. 1). In the depicted embodiment, the hook 34 includes a first prong 38, a second prong 40, and a hook base 42 interconnecting the first and second prongs 38, 40. The first and second prongs 38, 40 may be, for example, substantially perpendicular to the hook base 42. Regardless of their orientation, the first and second prongs 38, 40 along with the hook base 42 collectively define the recess 36. When the beam 28 is disposed in the recess 36, the hook 34 supports that beam 28. The hook 34 further defines at least one hook hole 44 extending through each of the first and second prongs 38, 40. It is contemplated that the hook 34 may have only one hook hole 44 extending through one of the first and second prongs 38, 40. Irrespective of the quantity, each hook hole 44 is configured, shaped, and sized to receive a protrusion as discussed in detail below in order to secure the beam 28 disposed in the recess 36 to the coupling assembly 32.

The coupling assembly 32 additionally includes a link 46 coupled to the hook 34. Specifically, the link 46 is coupled to the hook base 42 and may be obliquely angled relative to the hook base 42. In the depicted embodiment, the link 46 defines a first link end 48 and a second link end 50 opposite the first link end 48. The second link end 50 is directly coupled to the hook base 42. In the depicted embodiment, the link 46 may be a bar or a rod wholly or partly made of a substantially rigid material such as a metal or metal alloy.

The coupling assembly 32 further includes a base 52 directly coupled to the first link end 48 of the link 46. Accordingly, the base 52 is coupled to the link 46. Further, the base 52 may be wholly or partly made of a substantially rigid material, such as a metal, and includes a first or top wall 56 and a second or bottom wall 58 opposite the first wall 56. The first and second walls 56, 58 may be substantially planar. In addition, the base 52 may include a third or "first lateral" wall 60 extending from the first wall 56 to the second wall 58. The third wall 60 may be substantially planar. Aside from the third wall 60, the base 52 includes a fourth wall 62 extending from the first wall 56 to the second wall 58. The fourth wall 62 is substantially curved (e.g., U-shaped) and may be directly coupled to the edges of the third wall 60.

Figure 5:
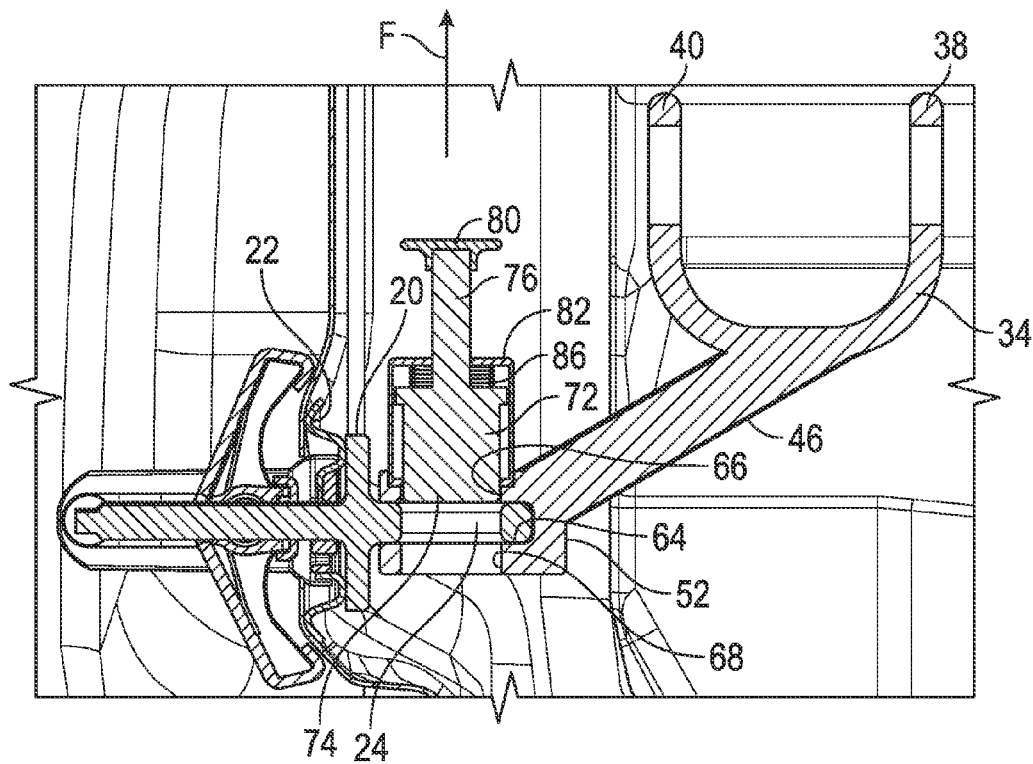
FIG. 5 is a schematic front, sectional view of the coupling assembly shown in FIG. 3 and the portion of the pickup bed shown in FIG. 4, wherein the coupling assembly is in an unlocked position and is engaged with the tie-down assembly.
Figure 6:
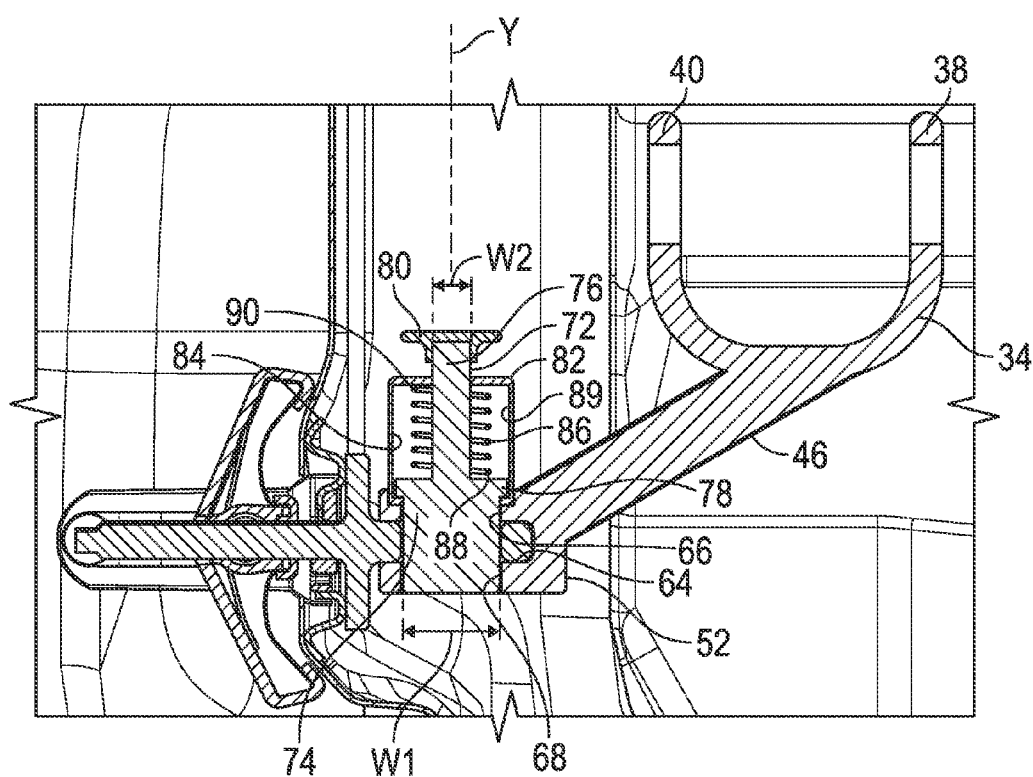
FIG. 6 is a schematic front, sectional view of the coupling assembly shown in FIG. 3 and the portion of the pickup bed shown in FIG. 4, wherein the coupling assembly is in the locked position and is secured to the tie-down assembly.

With reference to FIG. 4-6, the base 52 is hollow and, therefore, defines a base cavity 64 surrounded by the first wall 56, second wall 58, third wall 60, and fourth wall 62. In addition to the base cavity 64, the base 52 defines a first opening 66 extending through the first wall 56, a second opening 68 extending through the second wall 58, and a third opening 70 extending through the third wall 60. Each of the first opening 66, second opening 68, and third opening 70 leads to the base cavity 64. In other words, each of the first opening 66, second opening 68, and third opening 70 is in communication with the base cavity 64. The base cavity 64 is configured, shaped, and sized to receive the loop 24 of the tie-down assembly 20.

The coupling assembly 32 also includes a fastener 72 configured, shaped, and sized to be movably disposed in the first opening 66, second opening 68, and base cavity 64. As a non-limiting example, the fastener 72 may be a pin that extends along an axis Y (FIG. 6). In the depicted embodiment, the fastener 72 includes a first section 74 (FIG. 5) and a second section 76 (FIG. 5) spaced apart from the first section 74 along the axis Y. As shown in FIG. 6, the first section 74 defines a first width W1, such as a diameter, and the second section 76 defines a second width W2, such as a diameter. The first width W1 is larger than the second width W2. The first section 74 is specifically configured, shaped, and sized to slide through the first opening 66, second opening 68, and base cavity 64. The fastener 72 may include a rim 78 extending from the first section 74. The rim 78 may serve as a mechanical stop in order to prevent the fastener 72 from completely sliding through the first opening 66, second opening 68, and base cavity 64. The fastener 72 further includes a head 80 coupled to the second section 76. The head 80 facilitates manual handling of the fastener 72 and is disposed outside a casing 82. In operation, the fastener 72 is movably coupled to the base 52. As such, the fastener 72 is movable relative to the base 52 along the axis Y between a locked position (FIG. 4) and an unlocked position (FIG. 5). In the locked position, the fastener 72 extends through the base cavity 64. In the unlocked position, the fastener 72 does not block the base cavity 64. For example, no portion of the fastener 72 extends through the base cavity 64 when the fastener 72 is in the unlocked position. In other words, the fastener 72 is completely outside the base cavity 64 when disposed in the unlocked position. The second opening 68 receives the fastener 72 only when the fastener 72 is in the locked position.

Aside from the fastener 72, the coupling assembly 32 includes the casing 82, which is fixed to the base 52. Accordingly, the base 52 remains stationary relative to the casing 82. The fastener 72 is partially disposed within the casing 82 and can move along the axis Y relative to the casing 82 and the base 52. The casing 82 is specifically attached to the first wall 56 and may have a substantially cylindrical shape. For example, the first opening 66 may at least partially receive the casing 82 and the fastener 72. In the depicted embodiment, the casing 82 is hollow and defines a casing cavity 84. In particular, the casing 82 includes an inner casing surface 89 defining the casing cavity 84.

The coupling assembly 32 further includes a biasing member 86, such as a spring, operatively coupled between the casing 82 and the fastener 72. As such, the biasing member 86 biases the fastener 72 toward the locked position (FIG. 4). In other words, the biasing member 86 biases the fastener 72 toward the second wall 58. As a non-limiting example, the biasing member 86 may be a coil spring. In the depicted embodiment, the biasing member 86 is entirely disposed in casing cavity 84. Moreover, the biasing member 86 is disposed around the fastener 72. Specifically, the biasing member 86 is disposed around the second section 76 of the fastener 72. Further, the biasing member 86 defines a first member end 88 and a second member end 90 opposite the first member end 88. The first member end 88 is in contact with (e.g., abuts) the fastener 72, and the second member end 90 is in contact with (e.g., abuts) the casing 82. Specifically, the first member end 88 abuts the first section 74 of the fastener 72, whereas the second member end 90 abuts the inner casing surface 89 of the casing 82.

With continued reference to FIGS. 4-6, the coupling assembly 32 can be used for coupling the beam 28 to the pickup bed 12 in the storage position (FIG. 2). To do so, the fastener 72 is first moved relative to the base 52 from the locked position (FIG. 4) to the unlocked position (FIG. 5). The fastener 72 can be moved relative to the base 52 from the locked position to the unlocked position by applying a force F to the fastener 72 along the axis Y against the influence of the biasing member 86. Applying the force F to the fastener 72 causes the fastener 72 to move away from the second wall 58 of the base 52. The force F should be applied until the second section 76 of the fastener 72 is outside the base cavity 64 in order to allow the loop 24 to be positioned in the base cavity 64.

The coupling assembly 32 is then moved toward the tie-down assembly 20 while the fastener 72 is in the unlocked position until the loop 24 is mostly disposed in the base cavity 64. Specifically, the base 52 of the coupling assembly 32 is advanced toward the tie-down assembly 20 until the loop 24 is positioned in the base cavity 64 such that the aperture 26 is substantially aligned with the first section 74 of the fastener 72 as shown in FIG. 5. In other words, the loop 24 of the tie-down assembly 20 should be substantially aligned with the fastener 72 such that the aperture 26 of the loop 24 can receive the first section 74 of the fastener 72. Once the aperture 26 of the loop 24 is substantially aligned with the first section 74 of the fastener 72, the fastener 72 is released, thereby allowing the biasing member 86 to bias the fastener 72 through the aperture 26 and toward the locked position as shown in FIG. 6. At this point, the coupling assembly 32 is secured to the first side sidewall 16 (or second sidewall 18) of the pickup bed 12. More than one coupling assembly 32 may be secured to the first and second inner sidewalls 16, 18.

Figure 7:
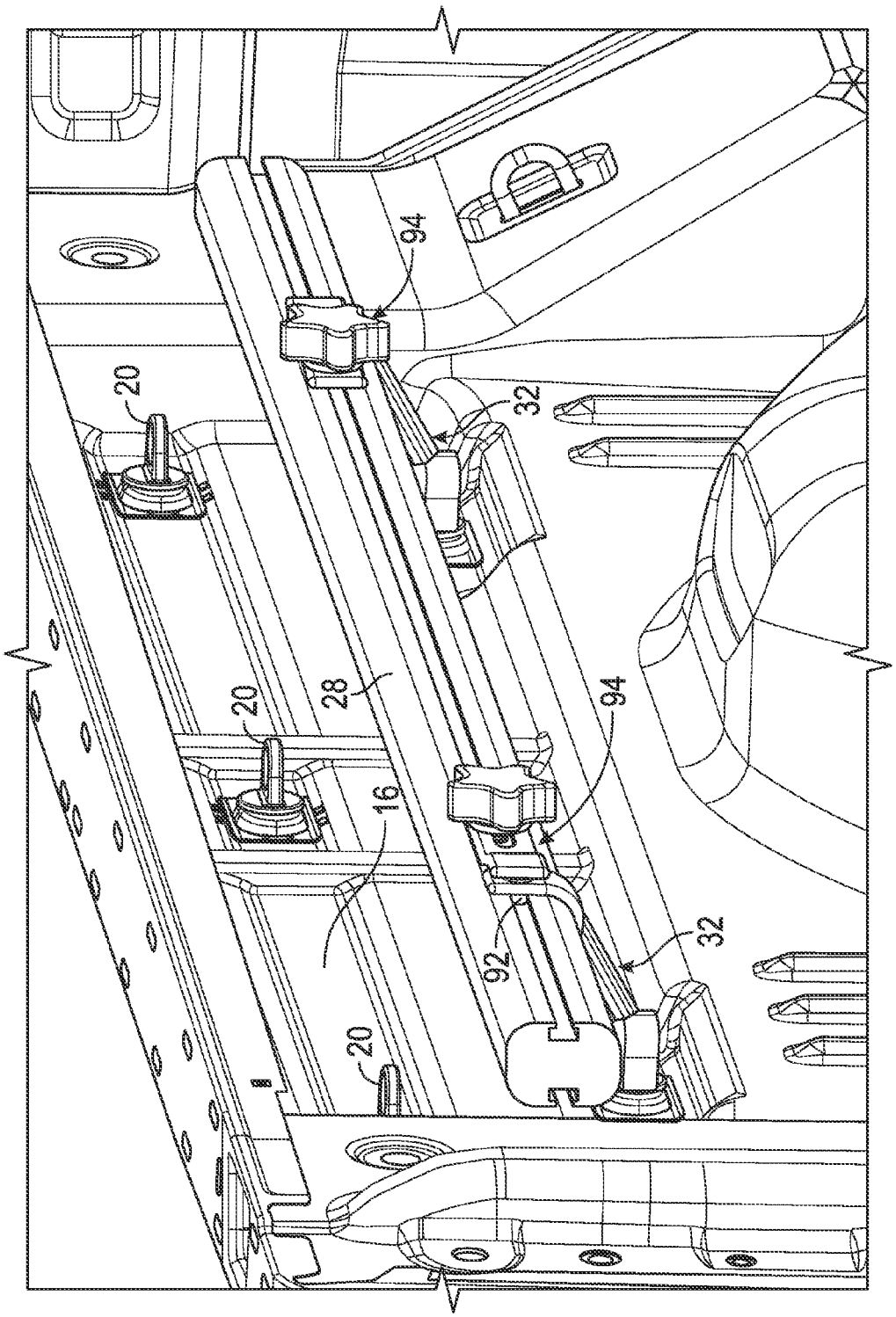
FIG. 7 is a schematic, perspective view of a portion of the pickup bed shown in FIG. 1, one of the beams shown in FIG. 1, and the coupling assembly shown in FIG. 2 coupling the beam to the pickup bed in the storage position.

With reference to FIG. 7, the beam 28 can then be disposed in the recess 36 (FIG. 3) of one or more coupling assemblies 32. Next, a pin 92 of the coupling mechanism 94 of the beam 28 can be inserted through the hook holes 44 to secure the beam 28 to the coupling assembly 32. The coupling mechanism 94 may be able, for example, to fix and tighten the pin 92 inserted through hook hole 44 to the coupling assembly 32.

While the best modes for carrying out the invention have been described in detail, those familiar with the art to which this invention relates will recognize various alternative designs and embodiments for practicing the invention within the scope of the appended claims.

The invention claimed is:

1. A coupling assembly, comprising:
   a hook;
   a base defining a base cavity;
   a link interconnecting the hook and the base;
   a fastener movably coupled to the base such that the fastener is movable relative to the base along an axis between a locked position and an unlocked position, wherein, in the locked position, the fastener extends through the base cavity, and, in the unlocked position, the fastener is outside the base cavity;
   a casing fixed to the base such that the base remains stationary relative to the casing, the fastener being partially disposed within the casing; and
   a biasing member operatively coupled between the casing and the fastener such that the biasing member biases the fastener toward the locked position.

2. The coupling assembly of claim 1, wherein the casing defines a casing cavity, and the biasing member is disposed in the casing cavity.

3. The coupling assembly of claim 1, wherein the biasing member is a coil spring and defines a first member end and a second member end opposite the first member end, the first member end abuts the fastener, and the second member end abuts the casing.

4. The coupling assembly of claim 3, wherein the casing defines an inner casing surface, the inner casing surface defines the casing cavity, and the second member end abuts with the inner casing surface.

5. The coupling assembly of claim 4, wherein the biasing member is disposed around the fastener.

6. The coupling assembly of claim 5, wherein the biasing member is entirely disposed in the casing cavity.

7. The coupling assembly of claim 1, wherein the link defines a first link end and a second link end opposite the first link end, the first link end being coupled to the base, and the second link end coupled to the hook.

8. The coupling assembly of claim 7, wherein the hook includes a first prong, a second prong, and a hook base interconnecting the first and second prongs, and the second link end is coupled to the hook base.

9. The coupling assembly of claim 8, wherein at least one of the first and second prongs defines a hook hole.

10. The coupling assembly of claim 7, wherein the first and second prongs are both substantially perpendicular to the hook base.

11. The coupling assembly of claim 7, wherein the link is obliquely angled relative to the hook base.

12. The coupling assembly of claim 1, wherein the base includes a first wall and a second wall opposite the first wall, the base defines a first opening extending through the first wall, the first opening receiving the casing and the fastener, the base defining a second opening extending through the second wall, the second opening receiving the fastener only when the fastener is in the locked position.

13. The coupling assembly of claim 12, wherein the base includes a third wall extending from the first wall to the second wall, the base defining a third opening extending through the third wall, the third opening leads to the base cavity.

14. The coupling assembly of claim 13, wherein the fastener includes a head disposed outside the casing.

15. A vehicle, comprising:
    a pickup bed including first and second inner sidewalls;
    a tie-down assembly coupled to the at least one of the first and second inner sidewalls, the tie-down assembly including a loop, the loop defining an aperture; and
    a coupling assembly coupled to the tie-down assembly, the coupling assembly including:
        a hook;
        a base defining a base cavity;
        a link interconnecting the hook and the base;
        a fastener movably coupled to the base such that the fastener is movable relative to the base along an axis between a locked position and an unlocked position, wherein, in the locked position, the fastener extends through the base cavity, and, in the unlocked position, the fastener is outside the base cavity;
        a casing fixed to the base such that the base remains stationary relative to the casing, the fastener being partially disposed within the casing; and
        a biasing member coupled between the casing and the fastener such that the biasing member biases the fastener toward the locked position; and
    wherein the loop is disposed in the base cavity, and the fastener extends through the aperture when the fastener is in the locked position.

16. The vehicle of claim 15, further comprising a beam coupled to the hook.

17. The vehicle of claim 16, wherein the beam defines a recess and the beam is disposed in the recess.

18. The vehicle of claim 17, wherein the beam is disposed along at least one of the first and second sidewalls when the beam is disposed in the recess.

19. The vehicle of claim 18, wherein the hook defines a first prong, a second prong, and a hook base interconnecting the first and second prongs, and the hook defines a hook hole extending through at least one of the first and second prongs, the hook hole.

20. The vehicle of claim 19, wherein the beam includes a coupling mechanism including a pin, and the pin extends through the hook hole in order to secure the beam to the coupling assembly.

* * * * *